(12) United States Patent
Germagian

(10) Patent No.: US 9,395,771 B1
(45) Date of Patent: Jul. 19, 2016

(54) PLENUM PRESSURE CONTROL SYSTEM

(75) Inventor: Mark Germagian, Hubbardston, MA (US)

(73) Assignee: PCE, Inc., Lincoln, NE (US)

( * ) Notice: Subject to any disclaimer, the term of this patent is extended or adjusted under 35 U.S.C. 154(b) by 2425 days.

(21) Appl. No.: 12/012,702

(22) Filed: Feb. 5, 2008

Related U.S. Application Data

(63) Continuation-in-part of application No. 11/977,974, filed on Oct. 26, 2007.

(51) Int. Cl.
*F24F 11/00* (2006.01)
*H05K 5/00* (2006.01)
*G06F 1/20* (2006.01)

(52) U.S. Cl.
CPC ........................ *G06F 1/20* (2013.01)

(58) Field of Classification Search
USPC .......................... 454/184, 238, 237
See application file for complete search history.

(56) References Cited

U.S. PATENT DOCUMENTS

| | | | |
|---|---|---|---|
| 4,261,256 A | 4/1981 | Joret | |
| 4,722,669 A | 2/1988 | Kundert | 417/32 |
| 4,860,163 A * | 8/1989 | Sarath | 361/695 |
| 5,102,040 A | 4/1992 | Harvey | 236/49.3 |
| 5,484,012 A | 1/1996 | Hiratsuka | |
| 5,535,814 A | 7/1996 | Hartman | 165/217 |
| 5,863,246 A | 1/1999 | Bujak, Jr. | 236/11 |
| 5,959,561 A | 9/1999 | Yamamura | 318/471 |
| 6,000,622 A | 12/1999 | Tonner et al. | 236/11 |
| 6,011,371 A | 1/2000 | VanBrocklin et al. | 318/471 |
| 6,034,873 A | 3/2000 | Stahl et al. | |
| 6,101,459 A | 8/2000 | Tavallaei et al. | |
| 6,104,003 A | 8/2000 | Jones | |
| 6,127,663 A | 10/2000 | Jones | |
| 6,188,189 B1 | 2/2001 | Blake | 318/471 |
| 6,247,898 B1 | 6/2001 | Henderson et al. | |
| 6,318,965 B1 | 11/2001 | Nair | 417/2 |
| 6,368,064 B1 | 4/2002 | Bendikas et al. | |
| 6,398,505 B1 | 6/2002 | Sekiguchi | |
| 6,537,019 B1 | 3/2003 | Dent | |
| 6,539,736 B1 | 4/2003 | Isazawa et al. | |
| 6,545,438 B1 | 4/2003 | Mays, II | |

(Continued)

OTHER PUBLICATIONS

"Rack Side Air Distribution Unit", http://www.apc.com/products/family/indes.cfm?id=248; Jun. 24, 2008; American Power Conversion Corp., 2 pages.

(Continued)

*Primary Examiner* — Steven B McAllister
*Assistant Examiner* — Brittany Towns
(74) *Attorney, Agent, or Firm* — Suiter Swantz pc llo

(57) ABSTRACT

A plenum pressure controlled cabinet includes a sideways cooled component mounted so as to define gaps between the cabinet and the component. Baffles block some of the gaps. A negative pressure maintained within the cabinet causes makeup air to be drawn into the cabinet through a gap not blocked by baffles between one side of the cabinet and a cool air intake of the component. Thus, cool air is provided to the cool air intake of the component. A plenum pressure controlled enclosure includes an equipment rack maintained at a neutral pressure, a plenum maintained at a slightly negative pressure or a neutral pressure, and a cooling unit. The plenum takes in air from the rack and expels it into the cooling unit. By controlling differential pressures in the rack and the plenum, air is efficiently drawn from the equipment rack and cooled utilizing the cooling unit.

7 Claims, 19 Drawing Sheets

(56) References Cited

U.S. PATENT DOCUMENTS

| | | | |
|---|---|---|---|
| 6,557,357 B2 | 5/2003 | Spinazzola et al. | |
| 6,694,759 B1* | 2/2004 | Bash et al. | 62/180 |
| 6,722,151 B2 | 4/2004 | Spinazzola et al. | |
| 6,725,132 B2 | 4/2004 | Frankel et al. | |
| 6,932,696 B2 | 8/2005 | Schwartz et al. | |
| 6,945,058 B2* | 9/2005 | Bash et al. | 62/89 |
| 6,954,684 B2 | 10/2005 | Frankel et al. | |
| 7,112,131 B2 | 9/2006 | Rasmussen et al. | 454/184 |
| 7,137,775 B2 | 11/2006 | Hopkins | |
| 7,167,993 B1 | 1/2007 | Thomas et al. | |
| 7,173,820 B2 | 2/2007 | Fink et al. | |
| 7,179,046 B2 | 2/2007 | Hopkins | |
| 7,228,204 B2 | 6/2007 | Iino et al. | |
| 7,330,350 B2* | 2/2008 | Hellriegel et al. | 361/679.48 |
| 7,447,022 B2 | 11/2008 | Murakami et al. | |
| 7,527,468 B2 | 5/2009 | Hopkins | |
| 7,604,535 B2 | 10/2009 | Germagian et al. | |
| 8,223,495 B1 | 7/2012 | Carlson et al. | |
| 8,553,416 B1 | 10/2013 | Carlson et al. | |
| 2002/0015287 A1 | 2/2002 | Shao | |
| 2004/0185770 A1 | 9/2004 | Soeholm et al. | |
| 2004/0196631 A1 | 10/2004 | Ueda et al. | |
| 2004/0257766 A1 | 12/2004 | Rasmussen et al. | |
| 2005/0209740 A1 | 9/2005 | Vann, Jr. | |
| 2005/0225936 A1 | 10/2005 | Day | |
| 2005/0270738 A1 | 12/2005 | Hellriegel et al. | |
| 2006/0108962 A1 | 5/2006 | Murray et al. | |
| 2006/0139877 A1 | 6/2006 | Germagian et al. | |
| 2006/0168975 A1 | 8/2006 | Malone et al. | |
| 2006/0227505 A1* | 10/2006 | Miyamoto et al. | 361/695 |
| 2006/0260338 A1 | 11/2006 | VanGilder et al. | |
| 2006/0272342 A1 | 12/2006 | Bash et al. | |
| 2007/0097636 A1* | 5/2007 | Johnson et al. | 361/695 |
| 2007/0099747 A1 | 5/2007 | Ando et al. | |
| 2007/0129000 A1* | 6/2007 | Rasmussen et al. | 454/184 |
| 2007/0146994 A1 | 6/2007 | Germagian et al. | |
| 2007/0213000 A1 | 9/2007 | Day | |
| 2007/0254583 A1 | 11/2007 | Germagian et al. | |
| 2007/0281639 A1 | 12/2007 | Clidaras et al. | |
| 2008/0055848 A1 | 3/2008 | Hamburgen et al. | |
| 2008/0055850 A1 | 3/2008 | Carlson et al. | |
| 2009/0173473 A1 | 7/2009 | Day | |
| 2010/0139908 A1 | 6/2010 | Slessman | |
| 2010/0216388 A1 | 8/2010 | Tresh et al. | |
| 2010/0248609 A1 | 9/2010 | Tresh et al. | |
| 2010/0312415 A1 | 12/2010 | Loucks | |
| 2011/0045759 A1 | 2/2011 | Rasmussen et al. | |
| 2011/0082592 A1 | 4/2011 | Saito et al. | |
| 2011/0094714 A1 | 4/2011 | Day | |
| 2011/0105010 A1 | 5/2011 | Day | |
| 2011/0127027 A1 | 6/2011 | Kashirajima et al. | |
| 2011/0128699 A1 | 6/2011 | Heydari et al. | |
| 2011/0207391 A1 | 8/2011 | Hamburgen et al. | |
| 2012/0014060 A1 | 1/2012 | Slessman | |
| 2012/0014061 A1 | 1/2012 | Slessman | |
| 2012/0041600 A1 | 2/2012 | Michael et al. | |
| 2012/0303164 A1 | 11/2012 | Smith et al. | |
| 2012/0329378 A1 | 12/2012 | Lucia et al. | |
| 2013/0138253 A1 | 5/2013 | Chainer et al. | |
| 2014/0141707 A1 | 5/2014 | Carlson et al. | |

OTHER PUBLICATIONS

"N-Series TeraFrame Network Cabinet", http://.chatsworth.com/Common/PageTemplates/PageMain.aspx?id-40186; Jun. 24, 2008; Chatsworth Products, Inc., 2 pages.

* cited by examiner

PLENUM PRESSURE CONTROL SYSTEM

CROSS-REFERENCE TO RELATED APPLICATIONS

The present application is a continuation-in-part application and claims priority under 35 U.S.C. §120 to the U.S. patent application Ser. No. 11/977,974 entitled: plenum pressure control system filed Oct. 26, 2007, (pending) which is herein incorporated by reference in its entirety.

FIELD OF THE INVENTION

The present disclosure generally relates to an environmental control system and more particularly to a plenum pressure control system.

BACKGROUND OF THE INVENTION

Large information handling system installations, such as data centers, server farms, and telecommunications switching systems (all referred to hereinafter generically as "data centers") generate a great deal of waste heat that must be dissipated in order for the information handling systems to operate effectively. The capacity of such data centers continues to grow at a rapid pace to meet the demands of an increasingly "wired" society. Not only are such installations steadily increasing in computing capacity and overall volume, the power density of such installations is also increasing. Greater size and density leads to greater or improved cooling requirements.

Conventional data center cooling systems typically include a cool air supply provided by air conditioning systems. Cool air from the air conditioner is routed through cabinet-enclosed rack-mounted computing or switching components. The air heated by the components is then supposed to return to the air conditioner to be cooled and re-circulated. In many installations, air warmed by the components finds its way back to the components before returning to be cooled by the air conditioning system. In this way, cooling air is mixed with air warmed by the components. This mixture of warm and cool air is much less effective at cooling the components. In fact, some estimates indicate that as much as 70% of cool air generated in a data center does not make contact with the equipment to be cooled. In this way, a great deal of the energy is wasted by producing cooling air that is not utilized effectively. Further, in many installations, IT equipment airflow requirements are significantly less than the airflow volume delivery of the cooling system, the matching of which may provide unity efficiency. A system and method that provides for efficient operation, ready maintenance and monitoring would therefore be highly desirable.

SUMMARY OF THE INVENTION

Accordingly, the present disclosure is directed to a plenum pressure control system.

A plenum pressure controlled equipment cabinet houses a sideways cooled component. Cold air enters the front cabinet and exhaust air exits the back of the plenum pressure controlled equipment cabinet. A pressure controller controls exhaust fans in response to a differential pressure detected by a pressure sensor to maintain a specific negative differential pressure. Cool air enters a cool air side of the sideways cooled component and warmed air exits a warm air side of the sideways cooled component. The sideways cooled component is mounted within the equipment cabinet so as to define gaps between the equipment cabinet and the sideways cooled component. Baffles are mounted within equipment cabinet to block the gaps between a side of equipment cabinet and the warm air side of sideways cooled component, the top of equipment cabinet and the top of the sideways cooled component, and the bottom of equipment cabinet and the bottom of the sideways cooled component. The negative pressure maintained within equipment cabinet causes makeup air to be drawn into equipment cabinet. The baffles block the gaps such that makeup air is drawn into the gap between one side of equipment cabinet and the cool air side of sideways cooled components. Thus, the cool air side of the sideways cooled components is provided with cool air that has been taken in from the front of equipment cabinet.

A plenum pressure controlled enclosure includes one or more equipment racks, a plenum, and one or more cooling units. The one or more equipment racks include a rack enclosure, a rack pressure controller and an exhaust fan. The one or more equipment racks intake cool air and expel heated air into the plenum. The rack pressure controller detects a differential pressure utilizing a pressure sensor and controls the exhaust fan to maintain a neutral differential pressure. The plenum includes a plenum enclosure and one or more flow controllers. The plenum intakes warm air from the one or more equipment racks and expels warm air into one or more cooling units. The flow controller detects a differential pressure and controls the one or more cooling units to maintain a slightly negative differential pressure or a neutral pressure. By controlling differential pressures in one or more equipment racks and the plenum, warm air is efficiently drawn from the one or more equipment racks and cooled utilizing the one or more cooling units.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
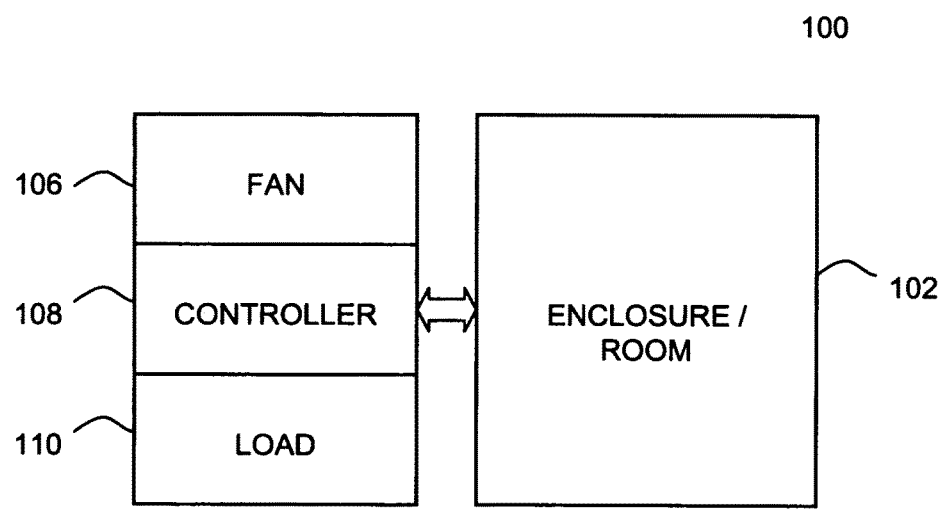
FIG. 1 is a conceptual block diagram of a system for controlling plenum pressure for an enclosure in accordance with an exemplary embodiment of the present invention.

In the conceptual block diagram of FIG. 1, a system 100 for controlling plenum pressure for an enclosure 102 in accordance with the principles of the present invention is illustrated. System 100 includes an enclosure 102, an enclosure fan 106, a pressure controller 108, and a load 110. Enclosure 102 includes a plurality of computing components. Enclosure 102 may comprise an equipment cabinet for computing components such as a server rack. Enclosure 102 may comprise an equipment room for computing components such as a server room. Enclosure 102 may include a differential pressure which corresponds to the difference between an internal plenum pressure and an external ambient pressure. Load 110 may comprise the impact of the computing components of the enclosure 102 on the differential pressure caused by intake and exhaust fans included in the individual computing components which may push air into or out of enclosure 102. The efficiency of cooling the enclosure 102 may relate to the differential pressure. By controlling plenum pressure the system 100 may control airflow in enclosure 102. Pressure controller 108 may include a sensor for detecting the differential pressure and may control enclosure fan 106 in response to the differential pressure. The sensor may be baffled to shield it from a specific air stream such as that from fan within the enclosure, for example. The sensor for detecting the differential pressure may include, but is not limited to, an air flow monitor and/or a pressure transducer.

Pressure controller 108 may control enclosure fan 106 to maintain a zero differential pressure. When maintaining substantially a zero pressure, the system 100 is removing the same volume of air from the enclosure 102 that is being forced into the enclosure 102. No more or no less air is being moved from the enclosure 102. Maintaining substantially a zero pressure may prevent cool air from being pulled into enclosure 102 and pushed out again before the cool air cools components in enclosure 102. Maintaining substantially a zero differential pressure may require the enclosure fan 106 to increase or decrease revolutions per minute (rpm) to accommodate changes in airflow rates. Pressure controller 108 may control enclosure fan 106 to maintain a specific differential pressure including, but not limited to, 1 ounce-force per square inch, 25 ounces-force per square inch, or 53.2 ounces-force per square inch. A specific pressure may be maintained to prevent cool air from being pulled into enclosure 102 and pushed out again before the cool air cools components in enclosure 102. A specific pressure may be maintained to obtain maximum performance of enclosure fan 106. A specific pressure may be maintained to maximize the time that cool air spends in enclosure 102 to maximize the cooling effect upon enclosure 102 of the cool air. The speed of enclosure fan 106 may vary based on the amount of power, for example voltage and/or current, provided. Pressure controller 108 may control enclosure fan 106 by controlling how much power is provided to enclosure fan 106. The speed of enclosure fan 106 may be adjusted to anywhere from 0% to 100% of its rated maximum speed. Additional factory settings for alarm conditions would be to send an alarm when enclosure fan 106 speed has increased and exceeded 90% capacity. This is an indication that enclosure fan 106 is near maximum capacity. This factory default setting can be changed in service or turned off. Enclosure fan 106 may comprise an exhaust fan. An exhaust fan may drive air out of enclosure 102. Enclosure fan 106 may comprise an input fan. An input fan may pull air into enclosure 102. Pressure controller 108 may be configured to provide a predetermined amount of power to enclosure fan 106 in the event that the sensor for detecting the differential pressure fails or does not detect the differential pressure.

Pressure controller 108 may automatically control enclosure fan 106 in response to the differential pressure. Alternatively, pressure controller 108 may include an input device for manual adjustment and pressure controller 108 may be manually adjusted to control enclosure fan 106 in response to the differential pressure. Input device may comprise any technology for gathering input including, but not limited to, a switch, a dial, a keyboard, a touch screen, a mouse, a track pad, a slider, a button, a toggle, a track ball, and a joystick.

Pressure controller 108 may include a display device. The display device may display indicators indicating operational information. The display device may also display alarms. For example, pressure controller 108 may include a temperature sensor. The display device may display an indicator indicating the temperature detected by the temperature sensor. The display device may display an alarm if the temperature detected by the temperature sensor exceeds a certain amount including, but not limited to, if the temperature detected exceeds 86° Fahrenheit. By way of an additional example, the display device may display an indicator indicating the differential pressure detected by the pressure sensor. The display device may display an alarm if the differential pressure detected by the pressure sensor exceeds a certain amount, including but not limited to, if the differential pressure exceeds zero differential pressure.

Display device may be implemented using any electronics technology, including light emitting diode (LED), liquid crystal display (LCD), polymer light emitting diode (PLED), plasma, cathode ray tube (CRT), liquid crystal on silicon (LCOS), organic light emitting diode (OLED), high temperature polysilicon (HTPS), active matrix OLED, surface conductive electron emitting display (SED), or digital light projection display (DLP), for example. Display device may vary widely in scope, from a simple single-LED status light to a plurality of display components, each of which may be highly complex and capable of displaying complex graphical and alphanumeric information.

Figure 2:
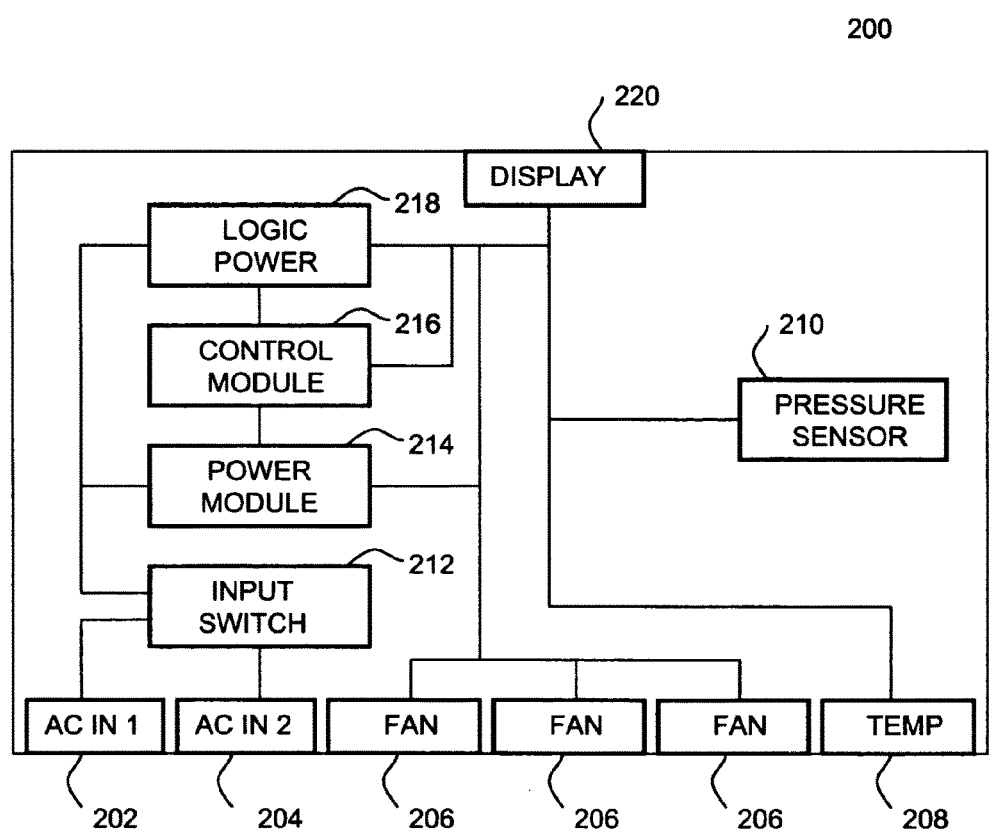
FIG. 2 is a block diagram of a pressure controller in accordance with an exemplary embodiment of the present invention.

Referring now to FIG. 2, an exemplary embodiment of a pressure controller 200 is illustrated. Pressure controller 200 comprises pressure sensor 210, power input sources 202 and 204, and power output sources 206. Power output sources 206 supply power to one or more enclosure fans. Pressure controller 200 may also include temperature sensor 208 and a display. Pressure controller 200 may utilize a logic power unit, a control module, a power module, and an input switch to determine based on the differential pressure detected by pressure sensor 210 to determine how much to power output sources 206 and to communicate operational information. Various of the logic blocks, including logic power unit, the control module, the power module, and the input switch may be implemented in a variety of technologies, including, but not limited to: discrete logic, state logic, microprocessors, microcontrollers, or field programmable gate arrays (FPGAs), for example. It should be understood that although this exemplary embodiment is illustrated with three power output sources 206, pressure controller 200 may comprise other numbers of power output sources 206, such as two or five. It should also be understood that although this exemplary embodiment is illustrated with two power input sources 202 and 204, pressure controller 200 may comprise other numbers of power input sources 202 and 204, such as three or six. Pressure controller 200 may be configured to provide or not provide power input sources 202 and/or 204 to power output sources 206 in the event that the pressure sensor 210 fails.

Figure 3:
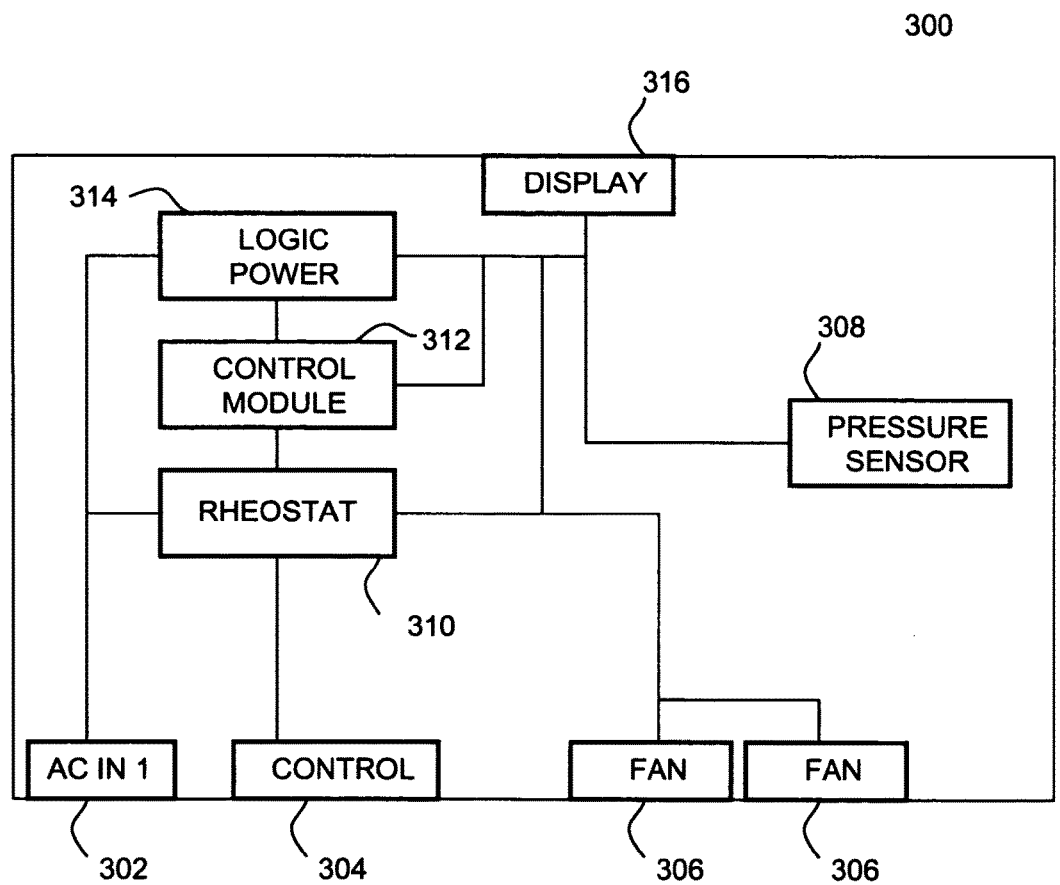
FIG. 3 is a block diagram of a pressure controller in accordance with an alternative embodiment of the present invention.

Referring now to FIG. 3, an alternative embodiment of a pressure controller 300 is illustrated. Pressure controller 300 comprises pressure sensor 308, power input source 302, rheostat 310, input device 304, and power output sources 306. Power output sources 306 supply power to one or more enclosure fans. Pressure controller 300 may also comprise a display. Pressure controller 300 may receive input from input device 304 which manually controls (utilizing a logic power unit, a control module, and rheostat 310), based on the differential pressure detected by pressure sensor 308, the amount of power supplied from supply power input source 302 to power output sources 306. The logic blocks, including logic power unit, the control module, and rheostat 310 may be implemented in a variety of technologies, including, but not limited to: discrete logic, state logic, microprocessors, microcontrollers, or field programmable gate arrays (FPGAs), for example. It should be understood that although this embodiment is illustrated with two power output sources 306, pressure controller 300 may comprise other numbers of power output sources 306, such as one or five. It should also be understood that although this embodiment is illustrated with one power input source 302, pressure controller 300 may comprise other numbers of power input source 302, such as three or six. Additionally, it should be understood that although this embodiment is described with rheostat 310, any voltage divider or device which has an adjustable resistance (such as a potentiometer) may be substituted for rheostat 310 without departing from the scope of the present invention. Pressure controller 300 may be configured to provide a predetermined amount of power from power input source 302 to power output sources 306 in the event that the pressure sensor 308 fails.

Figure 4:
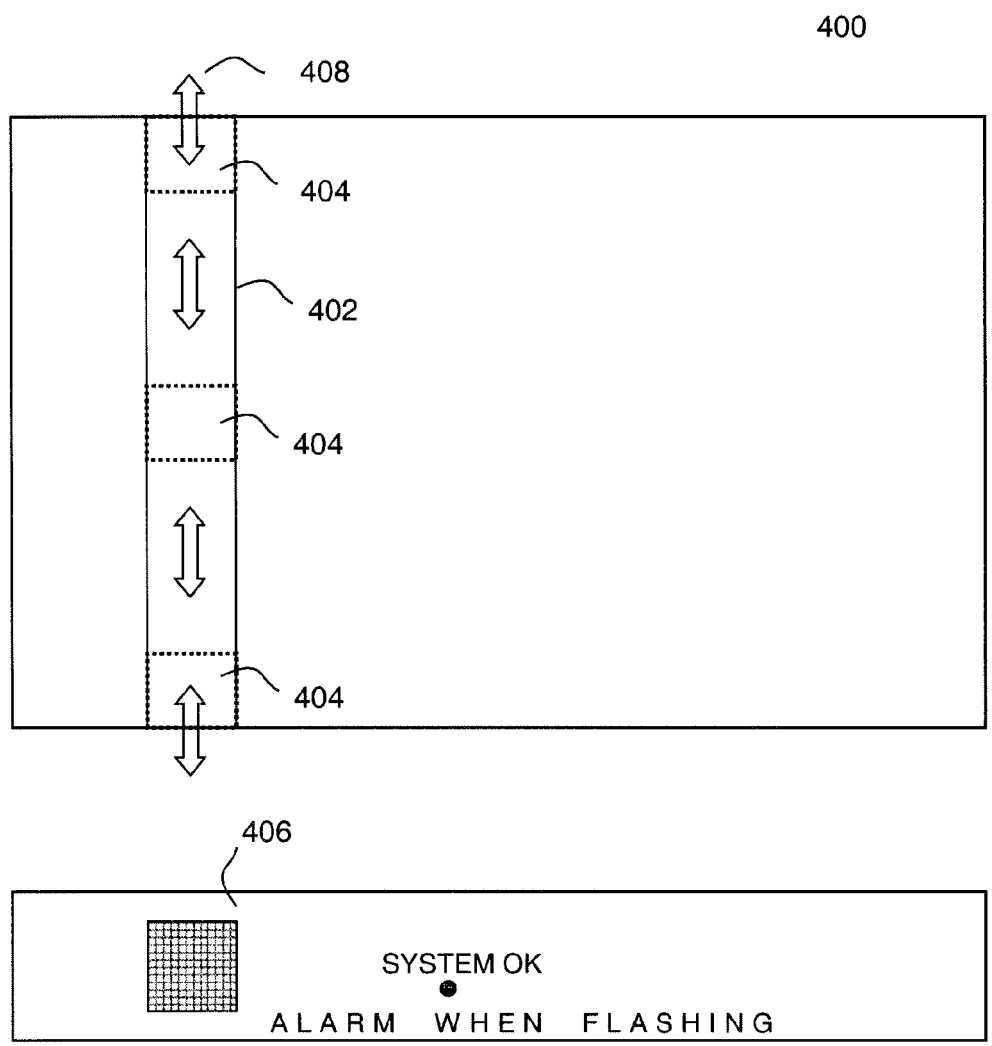
FIG. 4 is a plan view showing pressure direction or air flow through an air flow meter of a pressure controller and a front view of the display for the pressure controller in accordance with an exemplary embodiment of the present invention.

Referring now to FIG. 4, a plan view pressure direction or air flow 408 to a sensor 404 of a pressure controller 400 and a front view of the display for the pressure controller 400, in accordance with an exemplary embodiment of the present invention, is illustrated. Pressure sensor 404 may be located anywhere along a passageway 402 that connects the ambient outside the enclosure to the plenum inside the enclosure. Sensor 404 measures the differential pressure as pressure or as air flow 408 which moves in and/or out of an enclosure through the pressure sensor 404. The display for the pressure controller 400 includes vent 406 for pressure sensor 404. Pressure or air flow 408 is applied in and out of vent 406 as it flows through passageway 402. In this embodiment, the vent is illustrated as having a particular size and shape. However, in other embodiments, the vent may be round or have a different size. The display includes an indicator light, which may be implemented with LEDs, for example. The indicator light is labeled: "SYSTEM OK." The indicator light may change color to indicate a different status. For example, the SYSTEM OK light being green may indicate that the system is operating properly, while red may indicate that the system is not operating properly. As indicated by the label, flashing of the light may provide indication of an alarm condition. The display may be positioned on the pressure controller 400 to facilitate reading. For example, the display may be fixed at a predetermined angle (including flush) with the corresponding vertical surface, or the panel may be adjustable to accommodate various configurations.

Figure 5:
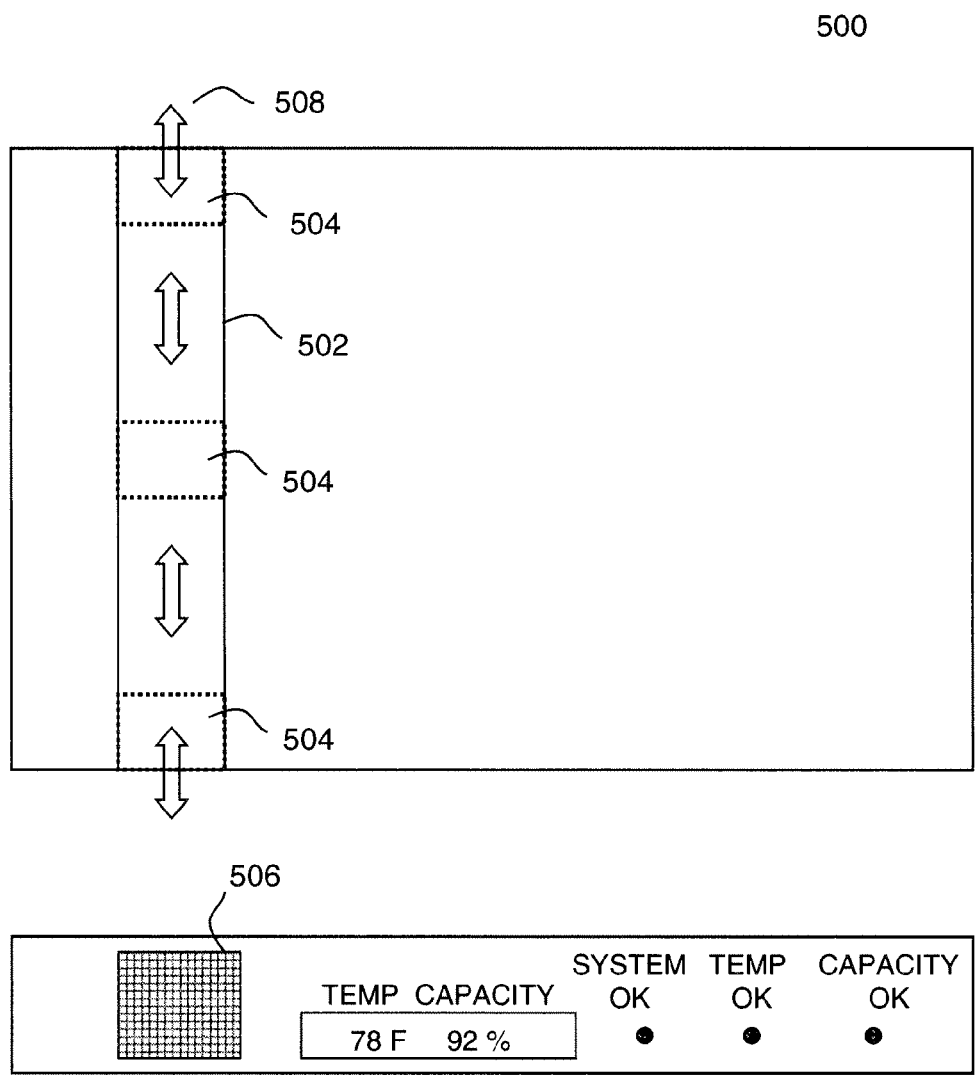
FIG. 5 is a plan view pressure direction or air flow through an air flow meter of a pressure controller and a front view of the display for the pressure controller in accordance with an alternative embodiment of the present invention.

Referring now to FIG. 5, a plan view pressure direction or air flow 508 to a sensor 504 of a pressure controller 500 and a front view of the display for the pressure controller 500, in accordance with an exemplary embodiment of the present invention, is illustrated. Pressure sensor 504 may be located anywhere along a passageway 502 that connects the ambient outside the enclosure to the plenum inside the enclosure. Sensor 504 measures the differential pressure as pressure or as air flow 508 which moves in and/or out of an enclosure through the pressure sensor 504. The display for the pressure controller 500 includes vent 506 for pressure sensor 504. Pressure or air flow 508 is applied in and out of vent 506 as it flows through passageway 502. In this embodiment, the vent is illustrated as having a particular size and shape. However, in other embodiments, the vent may be round or have a different size. The display includes three indicator lights, which may be implemented with LEDs, for example. The indicator lights are labeled: "SYSTEM OK," "TEMPERATURE OK," and "CAPACITY OK." Each of the indicator lights may change color to indicate a different status. For example, the TEMP OK light being green may indicate that the temperature is at an acceptable level, while red may indicate that the temperature is too high. Blinking or flashing of any or all of the lights may provide another indication, such as an alarm condition, for example. The display also includes alphanumeric indicators labeled "TEMP" and "CAPACITY" that indicate temperature and capacity, respectively. The temperature indicator may toggle between Centigrade and Fahrenheit indications of the temperature. The capacity utilization display provides an indication of the percentage of the total capacity of the airflow. Such an indication may be used for planning and new electronic equipment deployment decisions. The display may be positioned on the pressure controller 500 to facilitate reading. For example, the display may be fixed at a predetermined angle (including flush) with the corresponding vertical surface, or the panel may be adjustable to accommodate various configurations.

Figure 6:
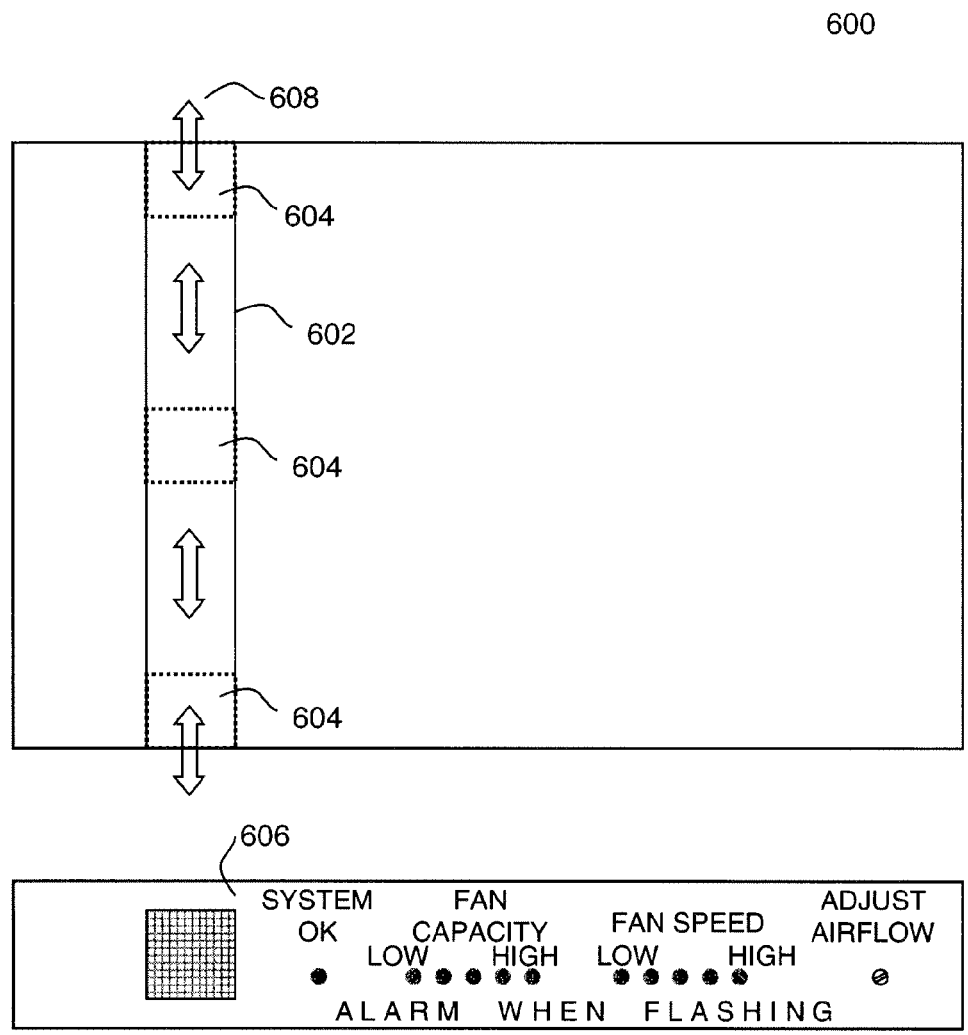
FIG. 6 is a plan view pressure direction or air flow through an air flow meter of a pressure controller and a front view of the display for the pressure controller in accordance with an alternative embodiment of the present invention.

Referring now to FIG. 6, a plan view pressure direction or air flow 608 to a sensor 604 of a pressure controller 600 and a front view of the display for the pressure controller 600, in accordance with an exemplary embodiment of the present invention, is illustrated. Pressure sensor 604 may be located anywhere along a passageway 602 that connects the ambient outside the enclosure to the plenum inside the enclosure. Sensor 604 measures the differential pressure as pressure or as air flow 608 which moves in and/or out of an enclosure through the pressure sensor 604. The display for the pressure controller 600 includes vent 606 for pressure sensor 604. Pressure or air flow 608 is applied in and out of vent 606 as it flows through passageway 602. In this embodiment, the vent is illustrated as having a particular size and shape. However, in other embodiments, the vent may be round or have a different size. The display includes an indicator light, which may be implemented with LEDs, for example. The indicator light is labeled: "SYSTEM OK." The indicator light may change color to indicate a different status. For example, the SYSTEM OK light being green may indicate that the system is operating properly, while red may indicate that the system is not operating properly. Flashing or blinking of the light may provide indication of an alarm condition. The display also includes two sets of indicator lights, which may be implemented with LEDs, for example, labeled "FAN CAPACITY UTILIZATION" and "FAN SPEED CONTROL." The FAN CAPACITY UTILIZATION set of indicator lights is labeled from "LOW" to "HIGH." The number of indicator lights lit in the set may indicate how HIGH or LOW the FAN CAPACITY UTILIZATION is. Alternatively, the number of indicator lights which are one color rather than another may indicate how HIGH or LOW the FAN CAPACITY UTILIZATION is. For example, if all five indicator lights are red the FAN CAPACITY UTILIZATION may be higher than when the left three indicator lights are red and the right two indicator lights are green. The FAN SPEED CONTROL set of indicator lights is labeled from "LOW" to "HIGH." The number of indicator lights lit in the set may indicate how HIGH or LOW the speed of the enclosure fans are. Alternatively, the number of indicator lights which are one color rather than another may indicate how HIGH or LOW the speed of the enclosure fans are. For example, if all five indicator lights are red the enclosure fan speed may be higher than when the left three indicator lights are red and the right two are green. The display also includes a knob labeled "ADJUST AIRFLOW." The knob may be adjusted to manually adjust the power that the pressure controller 600 supplies to enclosure fans. The display may be positioned on the pressure controller 600 to facilitate reading. For example, the display may be fixed at a predetermined angle (including flush) with the corresponding vertical surface, or the panel may be adjustable to accommodate various configurations.

Figure 7:
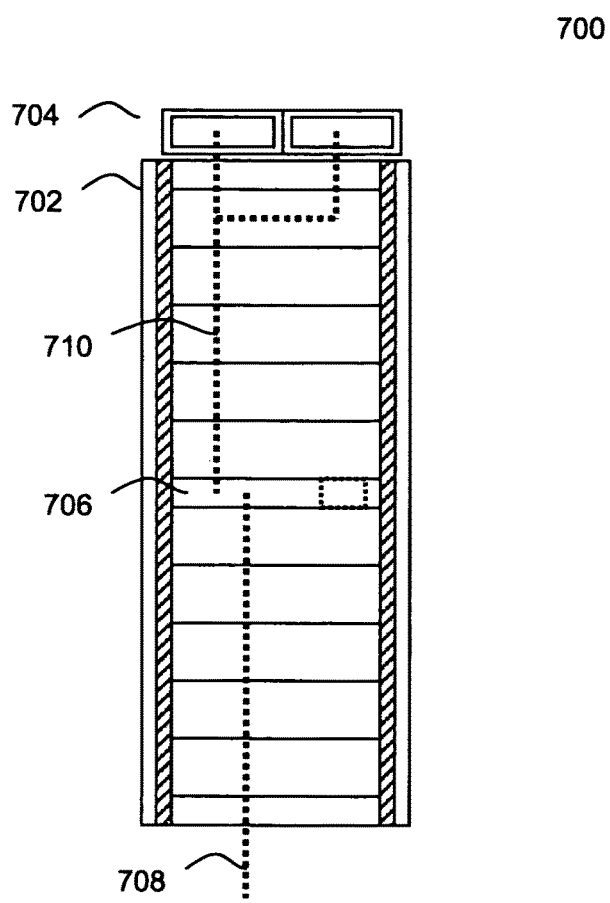
FIG. 7 is a rear view of a plenum pressure controlled equipment cabinet in accordance with an exemplary embodiment of the present invention.

Referring now to FIG. 7, a rear view of a plenum pressure controlled equipment cabinet 700 in accordance with exemplary embodiment of the present invention is illustrated. Plenum pressure controlled equipment cabinet 700 includes cabinet walls 702, pressure controller 706, exhaust enclosure fans 704, and input power 708 and output power 710. Pressure controller 706 detects a differential pressure. Exhaust enclosure fans 704 are controlled based on the differential pressure. Exhaust enclosure fans 704 may be controlled based on the differential pressure to maintain a zero differential pressure. Exhaust enclosure fans 704 may be controlled based on the differential pressure to maintain a specific differential pressure including, but not limited to, 1 ounce-force per square inch, 25 ounces-force per square inch, or 53.2 ounces-force per square inch. For example, if the differential pressure is too high, exhaust enclosure fans 704 may be sped up to reduce the differential pressure whereas if the differential pressure is too low, exhaust fans 704 may be sped down to increase the differential pressure.

Figure 8:
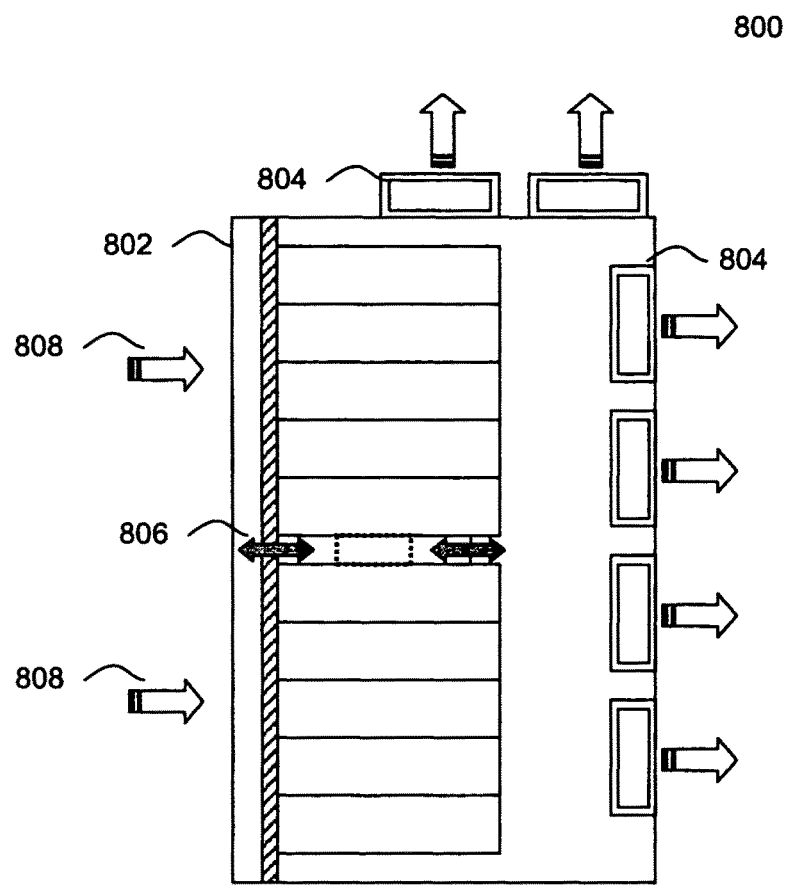
FIG. 8 is a side view of a plenum pressure controlled equipment cabinet in accordance with an alternative embodiment of the present invention.

Referring now to FIG. 8, a side view of a plenum pressure controlled equipment cabinet 800 in accordance with alternative embodiment of the present invention is illustrated. Plenum pressure controlled equipment cabinet 800 includes cabinet walls 802, pressure controller 806, and front and top exhaust enclosure fans 804. Airflows 808 represent air being pulled into plenum controlled equipment cabinet 800. Pressure controller 806 detects a differential pressure. Front and top exhaust enclosure fans 804 are controlled based on the differential pressure. Front and top exhaust enclosure fans 804 may be controlled based on the differential pressure to maintain a zero differential pressure. Front and top exhaust enclosure fans 804 may be controlled based on the differential pressure to maintain a specific differential pressure including, but not limited to, 1 ounce-force per square inch, 25 ounces-force per square inch, or 53.2 ounces-force per square inch. For example, if the differential pressure is too high, exhaust enclosure fans 804 may be sped up to reduce the differential pressure whereas if the differential pressure is too low, exhaust fans 804 may be sped down to increase the differential pressure.

Figure 9:
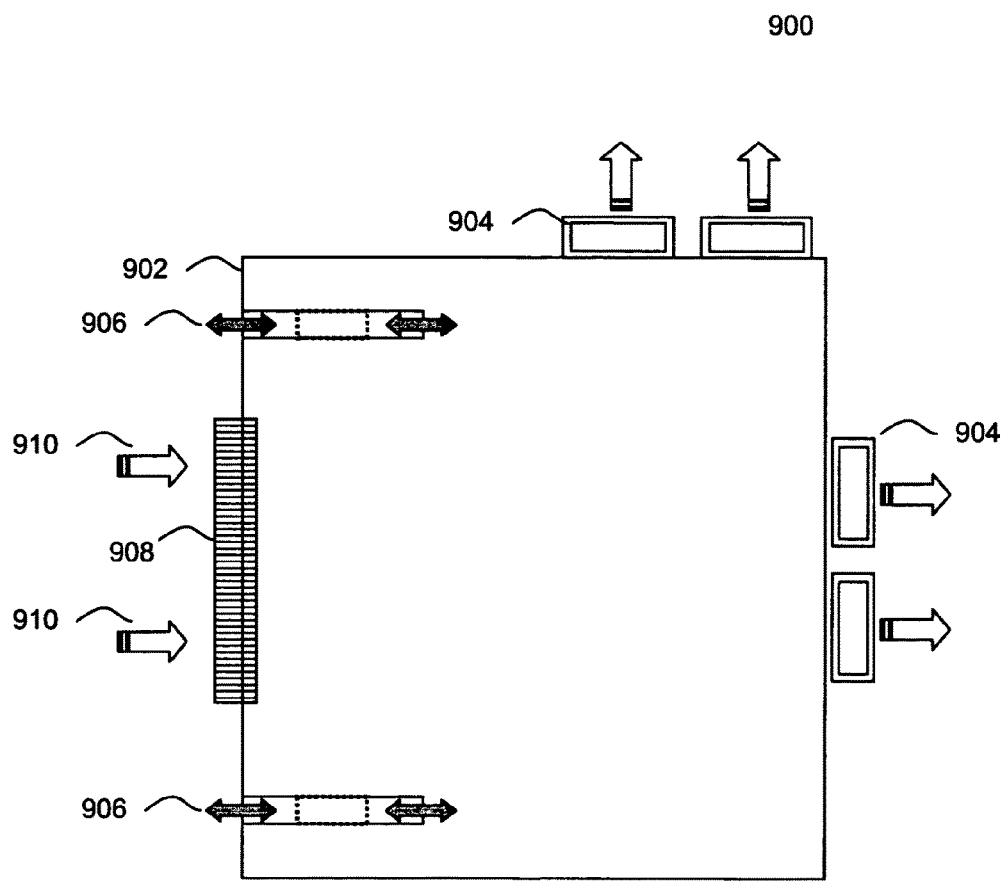
FIG. 9 is a side view of a plenum pressure controlled equipment room in accordance with an alternative embodiment of the present invention.

Referring now to FIG. 9, a side view of a plenum pressure controlled equipment room 900 in accordance with alternative embodiment of the present invention is illustrated. Plenum pressure controlled equipment room 900 includes room walls 902, two pressure controllers 906, top and front exhaust enclosure fans 904, and airflow load 908. Airflow load 908 represents air pressure being pulled into plenum pressure controlled equipment room 900. Pressure controllers 906 detect differential pressures. Top and front exhaust enclosure fans 904 are controlled based on the differential pressures. Top and front exhaust enclosure fans 904 may be controlled based on the differential pressures to maintain a zero differential pressure. Top and front exhaust enclosure fans 904 may be controlled based on the differential pressures to maintain a specific differential pressure including, but not limited to, 1 ounce-force per square inch, 25 ounces-force per square inch, or 53.2 ounces-force per square inch. For example, if the differential pressure at the top of equipment room 900 is too high, top exhaust enclosure fans 904 may be sped up to reduce the differential pressure whereas if the differential pressure at the top of equipment room 900 is too low, top exhaust fans 904 may be sped down to increase the differential pressure. By way of another example, if the differential pressure at the bottom of equipment room 900 is too high, front exhaust enclosure fans 904 may be sped up to reduce the differential pressure whereas if the differential pressure at the bottom of equipment room 900 is too low, front exhaust fans 904 may be sped down to increase the differential pressure. Although this embodiment is illustrated with two pressure controllers 906, any number of pressure controllers 906 may be utilized to effectively maintain equipment room pressures through communication between pressure controllers 906 and control of top and front exhaust fans 904.

Figure 10:
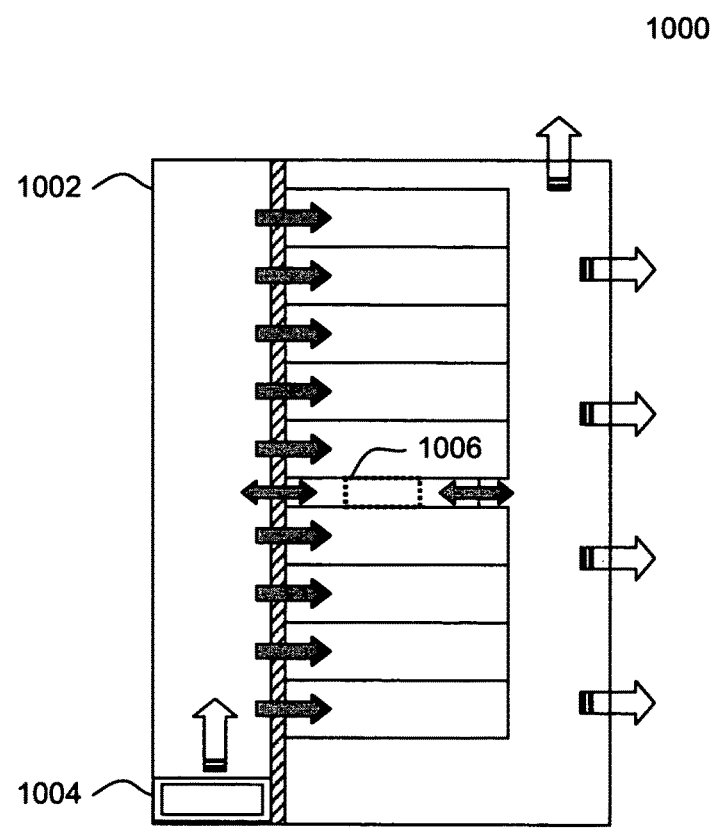
FIG. 10 is a side view of a plenum pressure controlled equipment cabinet in accordance with an alternative embodiment of the present invention.

Referring now to FIG. 10, a side view of a plenum pressure controlled equipment cabinet 1000 in accordance with alternative embodiment of the present invention is illustrated. Plenum pressure controlled equipment cabinet 1000 includes cabinet walls 1002, pressure controller 1006, and input enclosure fan 1004. Pressure controller 1006 detects a differential pressure. Input enclosure fan 1004 is controlled based on the differential pressure. Input enclosure fan 1004 may be controlled based on the differential pressure to maintain a zero differential pressure. Input enclosure fan 1004 may be controlled based on the differential pressure to maintain a specific differential pressure including, but not limited to, 1 ounce-force per square inch, 25 ounces-force per square inch, or 53.2 ounces-force per square inch. For example, if the differential pressure is too high, input enclosure fan 1004 may be sped down to reduce the differential pressure whereas if the differential pressure is too low, input fan 1004 may be sped up to increase the differential pressure.

Figure 11:
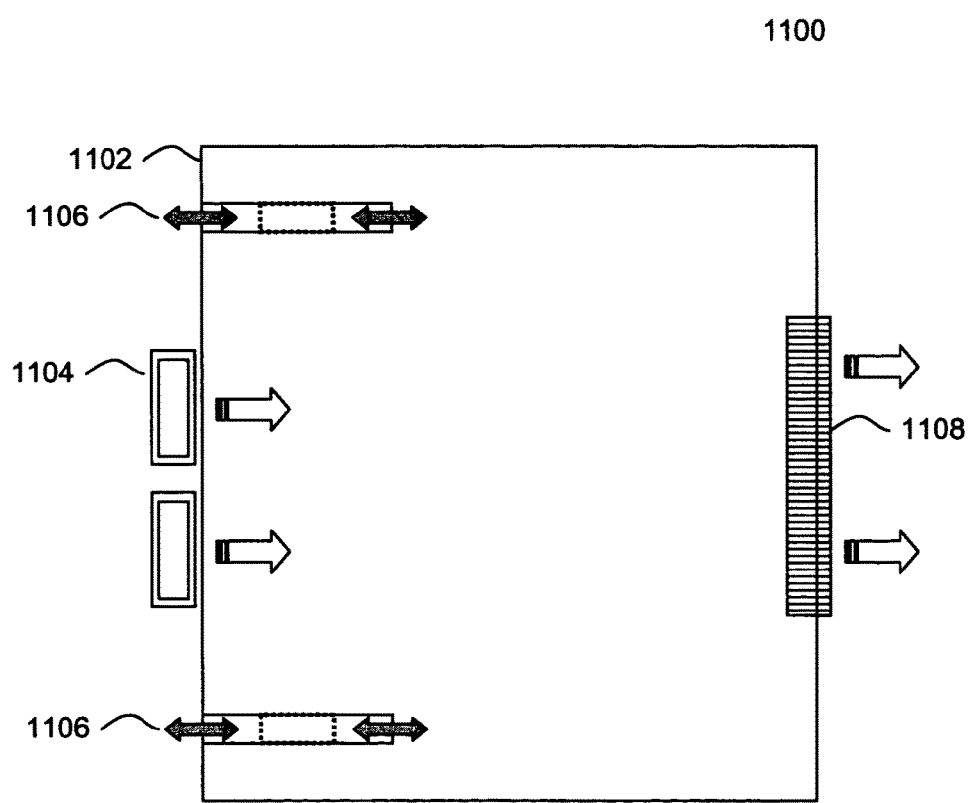
FIG. 11 is a side view of a plenum pressure controlled equipment room in accordance with an alternative embodiment of the present invention.

Referring now to FIG. 11, a side view of a plenum pressure controlled equipment room 1100 in accordance with alternative embodiment of the present invention is illustrated. Plenum pressure controlled equipment room 1100 includes room walls 1102, two pressure controllers 1106, input enclosure fans 1104, and airflow load 1108. Airflow load 1108 represents air pressure being driven out of plenum pressure controlled equipment room 1100. Pressure controllers 1106 detect a differential pressure. Input enclosure fans 1104 are controlled based on the differential pressure. Input enclosure fans 1104 may be controlled based on the differential pressure to maintain a zero differential pressure. Input enclosure fans 1104 may be controlled based on the differential pressure to maintain a specific differential pressure including, but not limited to, 1 ounce-force per square inch, 25 ounces-force per square inch, or 53.2 ounces-force per square inch. For example, if the differential pressure is too high, input enclosure fan 1104 may be sped down to reduce the differential pressure whereas if the differential pressure is too low, input fan 1104 may be sped up to increase the differential pressure. Although this embodiment is illustrated with two pressure controllers 1106, any number of pressure controllers 1106 may be utilized to effectively maintain equipment room pressures through communication between pressure controllers 1106 and control of input enclosure fans 1104.

Figure 12:
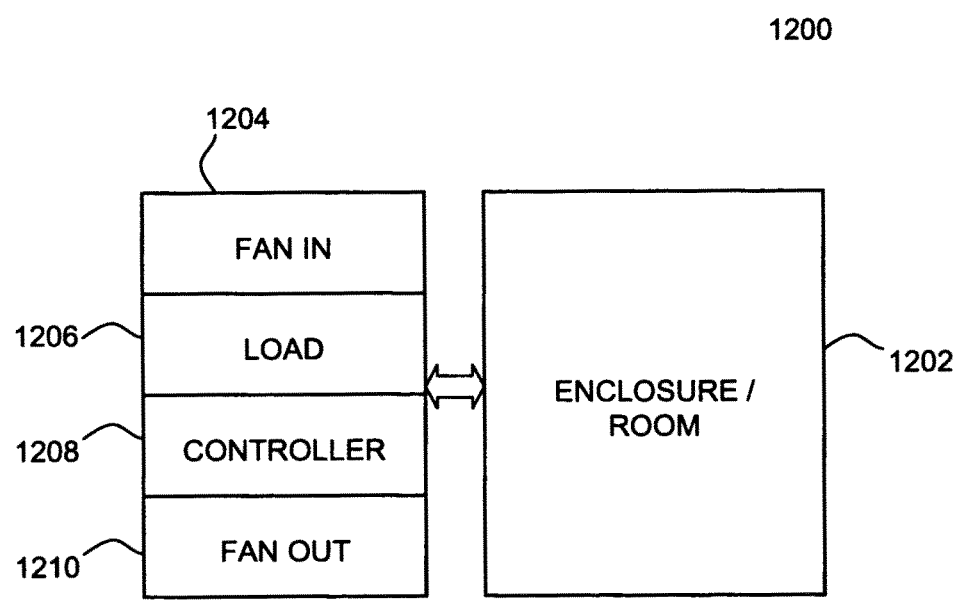
FIG. 12 is a conceptual block diagram of a system for controlling plenum pressure for an enclosure in accordance with an alternative embodiment of the present invention.

Referring now to FIG. 12, a conceptual block diagram of a system 1200 for controlling plenum pressure for an enclosure 1202 in accordance with the principles of the present invention is illustrated. System 1200 includes an enclosure 1202, an input enclosure fan 1204, an exhaust enclosure fan 1210, a pressure controller 1208, and a load 1206. Enclosure 1202 includes a plurality of computing components. Enclosure 1202 may comprise an equipment cabinet for computing components such as a server rack. Enclosure 1202 may comprise an equipment room for computing components such as a server room. Enclosure 1202 may include a differential pressure which corresponds to the difference between an internal plenum pressure and an external ambient pressure. Load 1206 may comprise the impact of the computing components of the enclosure 1202 on the differential pressure caused by intake and exhaust fans included in the individual computing components which may push air into or out of enclosure 1202. The efficiency of cooling the enclosure 1202 may relate to the differential pressure. Pressure controller 1208 may include a sensor for detecting the differential pressure and may control input enclosure fan 1204 and/or exhaust enclosure fan 1210 in response to the differential pressure. The sensor may be baffled to shield it from a specific air stream such as that from fan within the enclosure, for example. The sensor for detecting the differential pressure may include, but is not limited to, an air flow monitor and a pressure transducer.

Pressure controller 1208 may control input enclosure fan 1204 and/or exhaust enclosure fan 1210 to maintain a zero differential pressure. When maintaining substantially a zero pressure, the system 1200 is removing the same volume of air from the enclosure 1202 that is being forced into the enclosure 1202. No more or no less air is being moved from the enclosure 1202. Maintaining substantially a zero pressure may prevent cool air from being pulled into enclosure 1202 and pushed out again before the cool air cools components in enclosure 1202. Maintaining substantially a zero differential pressure will require the input enclosure fan 1204 and/or the exhaust enclosure fan 1210 to speed up and speed down to accommodate changes in airflow rates. Pressure controller 1208 may control input enclosure fan 1204 and/or exhaust enclosure fan 1210 to maintain a specific differential pressure including, but not limited to, 1 ounce-force per square inch, 25 ounces-force per square inch, or 53.2 ounces-force per square inch. A specific pressure may be maintained to prevent cool air from being pulled into enclosure 1202 and pushed out again before the cool air cools components in enclosure 1202. A specific pressure may be maintained to obtain maximum performance of input enclosure fan 1204 and/or exhaust enclosure fan 1210. A specific pressure may be maintained to maximize the time that cool air spends in enclosure 1202 to maximize the cooling effect upon enclosure 1202 of the cool air. The speed of input enclosure fan 1204 and exhaust enclosure fan 1210 may vary based on the amount of power provided. Pressure controller 1208 may control input enclosure fan 1204 and/or exhaust enclosure fan 1210 by controlling how much power is provided to the respective enclosure fan. The speed of input enclosure fan 1204 and/or exhaust enclosure fan 1210 may be adjusted to anywhere from 0% to 100% of their rated maximum speed. Additional factory settings for alarm conditions would be to send an alarm when input enclosure fan 1204 and/or exhaust enclosure fan 1210 speed has increased and exceeded 90% capacity. This is an indication that input enclosure fan 1204 and/or exhaust enclosure fan 1210 is near maximum capacity. This factory default setting can be changed in service or turned off. Exhaust enclosure fan 1204 may drive air out of enclosure 1202. Input enclosure fan 1210 may pull air into enclosure 1202. Pressure controller 1208 may be configured to provide a predetermined amount of power to input enclosure fan 1204 and/or exhaust enclosure fan 1210 in the event that the sensor for detecting the differential pressure fails or is does not detect the differential pressure.

Pressure controller 1208 may automatically control input enclosure fan 1204 and/or exhaust enclosure fan 1210 in response to the differential pressure. Alternatively, pressure controller 1208 may include an input device for manual adjustment and pressure controller 1208 may be manually adjusted to control input enclosure fan 1204 and/or exhaust enclosure fan 1210 in response to the differential pressure. Input device may comprise any technology for gathering input including, but not limited to, a switch, a dial, a keyboard, a touch screen, a mouse, a track pad, a slider, a button, a toggle, a track ball, and a joystick.

Pressure controller 1208 may include a display device. The display device may display indicators indicating operational information. The display device may also display alarms. For example, pressure controller 1208 may include a temperature sensor. The display device may display an indicator indicating the temperature detected by the temperature sensor. The display device may display an alarm if the temperature detected by the temperature sensor exceeds a certain amount including, but not limited to, if the temperature detected exceeds 86° Fahrenheit. By way of an additional example, the display device may display an indicator indicating the differential pressure detected by the pressure controller 1208. The display device may display an alarm if the differential pressure detected by the pressure controller 1208 exceeds a certain amount, including but not limited to, if the differential pressure exceeds zero differential pressure.

Display device may be implemented using any electronics technology, including light emitting diode (LED), liquid crystal display (LCD), polymer light emitting diode (PLED), plasma, cathode ray tube (CRT), liquid crystal on silicon (LCOS), organic light emitting diode (OLED), high temperature polysilicon (HIPS), active matrix OLED, surface conductive electron emitting display (SED), or digital light projection display (DLP), for example. Display device may vary widely in scope, from a simple single-LED status light to a plurality of display components, each of which may be highly complex and capable of displaying complex graphical and alphanumeric information.

Figure 13:
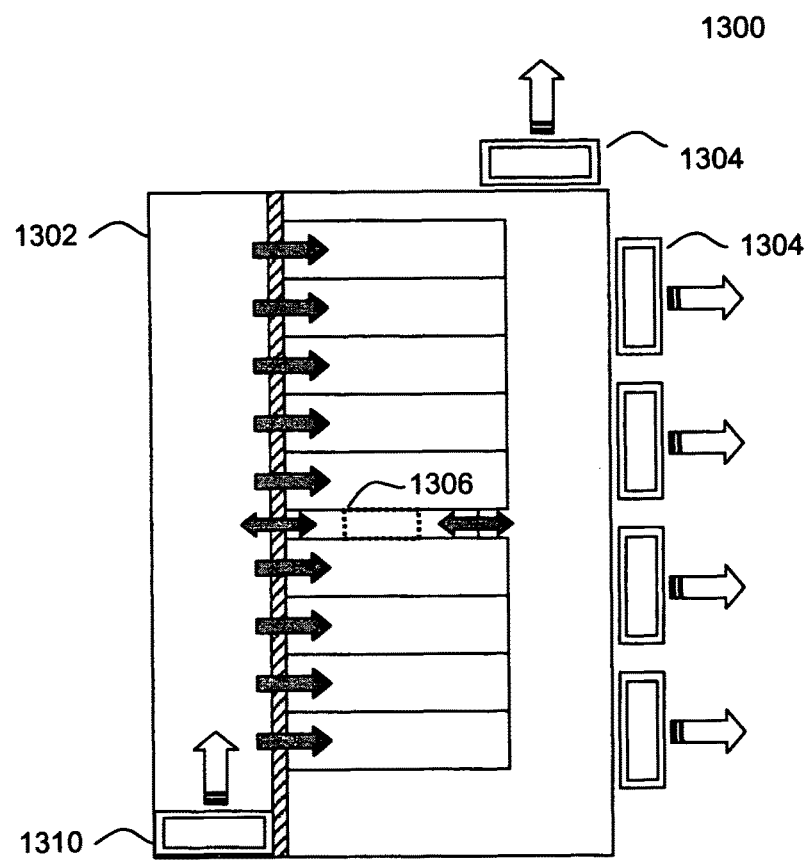
FIG. 13 is a side view of a plenum pressure controlled equipment cabinet in accordance with an alternative embodiment of the present invention.

Referring now to FIG. 13, a side view of a plenum pressure controlled equipment cabinet 1300 in accordance with alternative embodiment of the present invention is illustrated. Plenum pressure controlled equipment cabinet 1300 includes cabinet walls 1302, pressure controller 1306, and input enclosure fan 1310 and exhaust enclosure fans 1304. Pressure controller 1306 detects a differential pressure. Input enclosure fan 1310 and exhaust enclosure fans 1304 are controlled based on the differential pressure. Input enclosure fan 1310 and exhaust enclosure fans 1304 may be controlled based on the differential pressure to maintain a zero differential pressure. Input enclosure fan 1310 and exhaust enclosure fans 1304 may be controlled based on the differential pressure to maintain a specific differential pressure including, but not limited to, 1 ounce-force per square inch, 25 ounces-force per square inch, or 53.2 ounces-force per square inch. For example, if the differential pressure is too high, input enclosure fan 1310 may be sped down to reduce the differential pressure whereas if the differential pressure is too low, input fan 1310 may be sped up to increase the differential pressure. By way of another example, if the differential pressure is too high, exhaust enclosure fan 1304 may be sped up to reduce the differential pressure whereas if the differential pressure is too low, exhaust fan 1304 may be sped down to increase the differential pressure.

Figure 14:
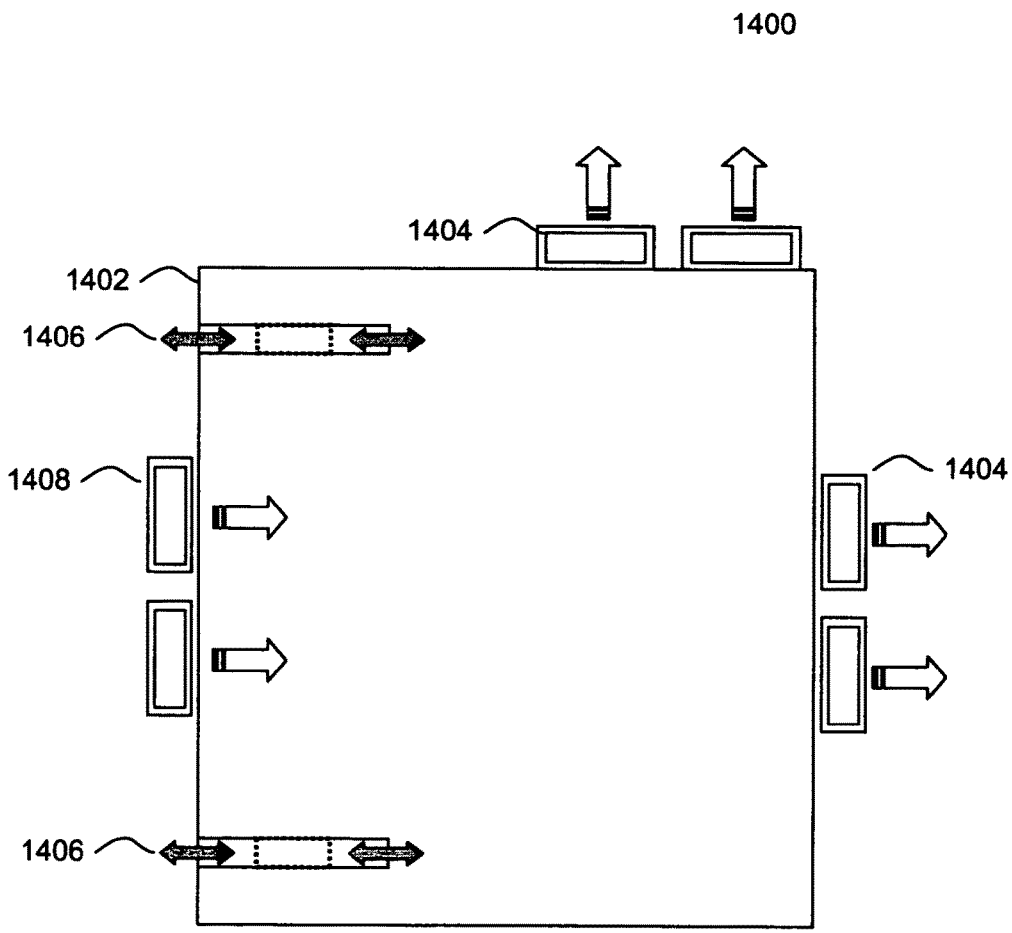
FIG. 14 is a side view of a plenum pressure controlled equipment room in accordance with an alternative embodiment of the present invention.

Referring now to FIG. 14, a side view of a plenum pressure controlled equipment room 1400 in accordance with alternative embodiment of the present invention is illustrated. Plenum pressure controlled equipment room 1400 includes room walls 1402, two pressure controllers 1406, input exhaust enclosure fans 1408, and top and front exhaust enclosure fans 1404. Pressure controllers 1406 detect a differential pressure. Input enclosure fans 1408 and top and bottom exhaust enclosure fans 1404 are controlled based on the differential pressure. Input enclosure fans 1408 and top and bottom enclosure fans 1404 may be controlled based on the differential pressure to maintain a zero differential pressure. Input enclosure fans 1408 and top and bottom enclosure fans 1404 may be controlled based on the differential pressure to maintain a specific differential pressure including, but not limited to, 1 ounce-force per square inch, 25 ounces-force per square inch, or 53.2 ounces-force per square inch. For example, if the differential pressure is too high, input enclosure fan 1408 may be sped down to reduce the differential pressure whereas if the differential pressure is too low, input fan 1408 may be sped up to increase the differential pressure. By way of another example, if the differential pressure at the top of equipment room 1400 is too high, top exhaust enclosure fans 1404 may be sped up to reduce the differential pressure whereas if the differential pressure at the top of equipment room 1400 is too low, top exhaust fans 1404 may be sped down to increase the differential pressure. By way of yet another example, if the differential pressure at the bottom of equipment room 1400 is too high, front exhaust enclosure fans 1404 may be sped up to reduce the differential pressure whereas if the differential pressure at the bottom of equipment room 1400 is too low, front exhaust fans 1404 may be sped down to increase the differential pressure. Although this embodiment is illustrated with two pressure controllers 1406, any number of pressure controllers 1406 may be utilized to effectively maintain equipment room pressures through communication between pressure controllers 1406 and control of input fans 1408 and top and front exhaust fans 1404.

Figure 15:
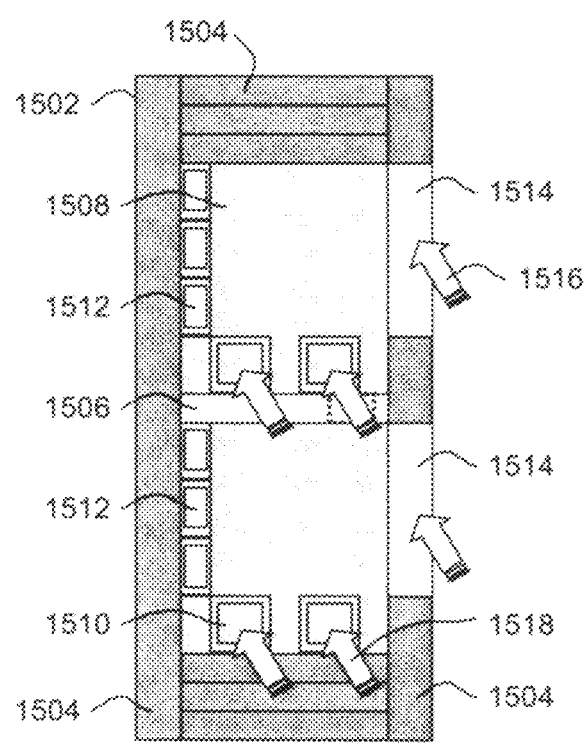
FIG. 15 illustrates a front internal view of a plenum pressure controlled equipment cabinet, in accordance with an alternative embodiment of the presents invention.
Figure 16:
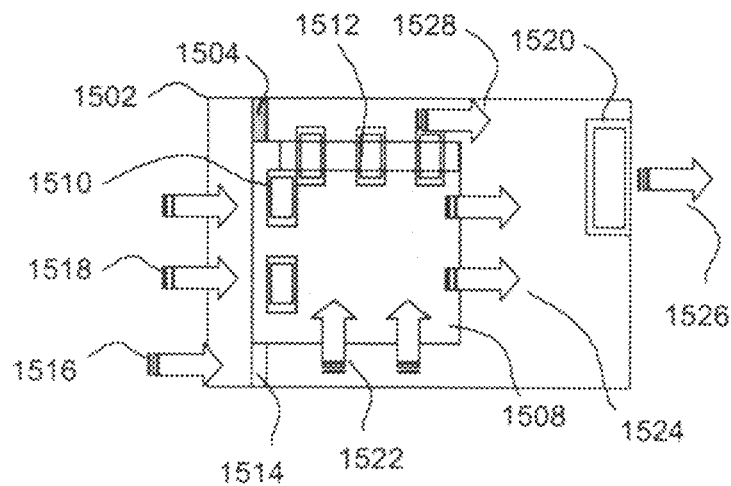
FIG. 16 illustrates a top internal view of a plenum pressure controlled equipment cabinet, in accordance with an exemplary embodiment of the present invention.
Figure 17:
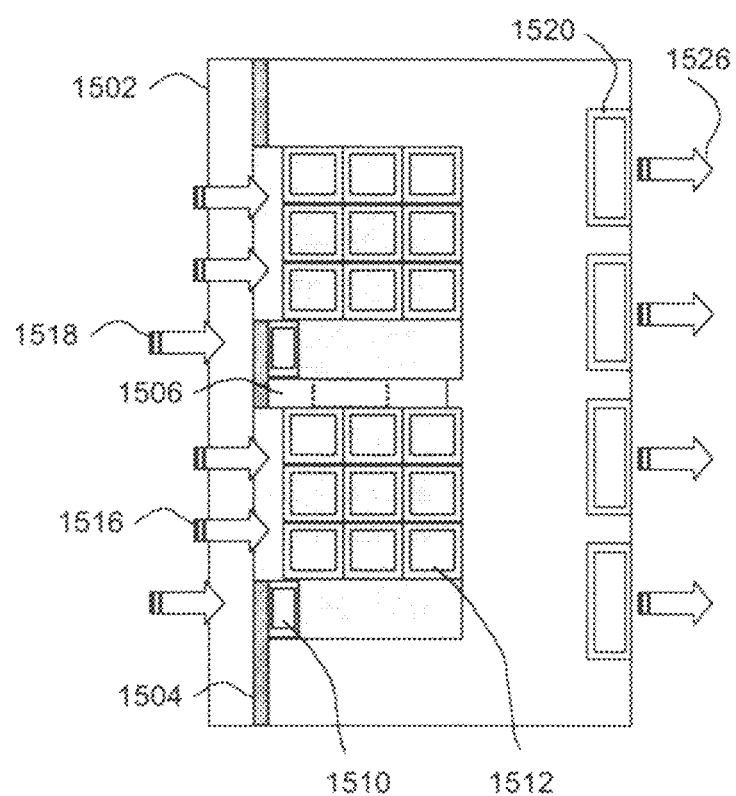
FIG. 17 illustrates a side internal view of a plenum pressure controlled equipment cabinet, in accordance with exemplary embodiment of the present invention is illustrated.

Referring now to FIGS. 15 through 17, a plenum pressure controlled equipment cabinet 1502, in accordance with alternative embodiment of the present invention, is illustrated. Cold air 1518 enters the front of equipment cabinet 1502 and exhaust air 1526 exits the back of equipment cabinet 1502. Pressure controller 1506 controls exhaust fans 1520 in response to a differential pressure detected by a pressure sensor within pressure controller 1506 to maintain a specific negative differential pressure. The specific negative pressure may be a slight negative differential pressure including, but not limited to, −1 ounce-force per square inch.

Equipment cabinet 1502 houses sideways cooled components 1508. Sideways cooled components 1508 may comprise any sideways cooled components including, but not limited to, a sideways cooled network switch. Cool air 1522 enters a cool air side of sideways cooled components 1508 and warmed air 1528 exits a warm air side of sideways cooled components 1508. Sideways fan array 1512 aids in taking in air from the cool air side of sideways cooled components 1508 and expelling air from the warm air side of sideways cooled components 1508. Sideways fan array 1512 is illustrated as an array of nine output fans separate from sideways cooled component 1508. However, it should be understood that any number of fans may be used, input fans may be placed on the cool air side of sideways cooled components 1508 rather than output fans on the warm air side of sideways cooled components 1508, and sideways fan array 1512 may be incorporated into sideways cooled components 1508. Sideways cooled components 1508 are mounted within equipment cabinet 1502 so as to define gaps between the front of equipment cabinet 1502 and the front of sideways cooled components 1508, the back of equipment cabinet 1502 and the back of sideways cooled components 1508, the left side of equipment cabinet 1502 and the warm air side of sideways cooled components 1508, the right side of equipment cabinet 1502 and the cool air side of sideways cooled components 1508, the top of equipment cabinet 1502 and the top of sideways cooled components 1508, and the bottom of equipment cabinet 1502 and the bottom of sideways cooled components 1508. Baffles 1504 are mounted within equipment cabinet to block the gaps between the left side of equipment cabinet 1502 and the warm air side of sideways cooled components 1508, the top of equipment cabinet 1502 and the top of sideways cooled components 1508, and the bottom of equipment cabinet 1502 and the bottom of sideways cooled components 1508. Baffles 1504 may comprise any material to block the gaps including, but not limited to, metal, plastic, and/or brush strips.

As illustrated, sideways cooled components 1508 also include power supplies 1510. Power supplies 1510 intake air from the front of sideways cooled components 1508 and expel air from the back of sideways cooled components 1508. It should be understood that sideways cooled components 1508 may not include power supplies 1510 without departing from the scope of the present disclosure. As illustrated, pressure controller 1506 is mounted between sideways cooled components 1508. It should be understood that pressure controller 1506 may be located anywhere within equipment cabinet 1502 without departing from the scope of the present disclosure. As illustrated, there are two sideways cooled components 1508. However, it should be understood that equipment cabinet 1502 may include any number of sideways cooled components 1508 without departing from the scope of the present disclosure. Although equipment cabinet 1502 has been described as including exhaust fans 1520, equipment cabinet 1502 may include input fans in addition to or instead of exhaust fans 1520 and pressure controller 1506 may control the input fans in response to a differential pressure detected by the pressure sensor to maintain a specific negative differential pressure.

FIG. 15 illustrates a front internal view of equipment cabinet 1502. Baffles 1504 block the gaps between the top, bottom, and sides of the sideways cooled components 1508 and the equipment cabinet 1502, except for the gap between the cool air side of sideways cooled components 1508 and the right side of equipment cabinet 1502. FIG. 16 illustrates a top internal view of equipment cabinet 1502. FIG. 17 illustrates a side internal view of equipment cabinet 1502.

The negative pressure maintained within equipment cabinet 1502 causes makeup air 1516 to be drawn into equipment cabinet 1502. The baffles 1504 block the gaps between the left side of equipment cabinet 1502 and the warm air side of sideways cooled components 1508, the top of equipment cabinet 1502 and the top of sideways cooled components 1508, and the bottom of equipment cabinet 1502 and the bottom of sideways cooled components 1508 such that makeup air 1516 is drawn into the gap between the right side of equipment cabinet 1502 and the cool air side of sideways cooled components 1508. Thus, the cool air side of the sideways cooled components 1508 is provided with cool air that has been taken in from the front of equipment cabinet 1508. As illustrated, sideways cooled components 1508 have been described as having a cool air side on the right side and a warm air side on the left side. However, it should be understood that sideways cooled components 1508 may have a cool air side on the left side and a warm air side on the right side. In such a case, baffles 1504 would block the gap between the right side of equipment cabinet 1502 and the warm air side of sideways cooled components 1508 and not block the gap between the left side of equipment cabinet 1502 and the cool air side of sideways cooled components 1508.

Figure 18:
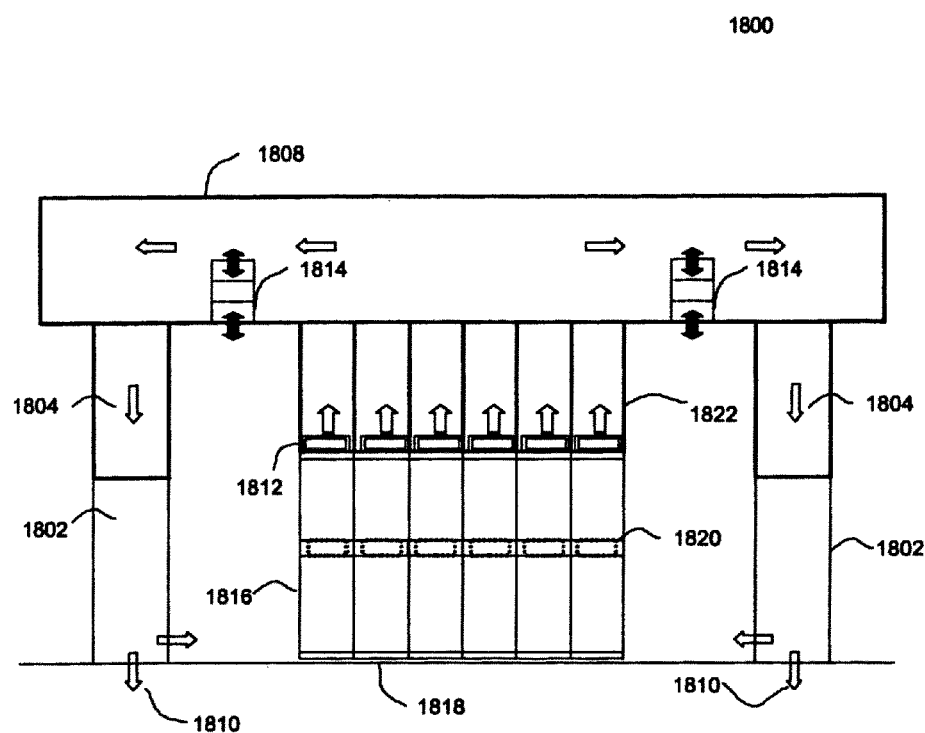
FIG. 18 illustrates a side view of a plenum pressure controlled enclosure, in accordance with an alternative embodiment of the present invention.

Referring now to FIG. 18, a plenum pressure controlled enclosure 1800 in accordance with an alternative embodiment of the present invention is illustrated. Enclosure 1800 includes one or more equipment racks 1816, ceiling plenum 1808, and cooling units 1802. Equipment racks 1816 include a rack enclosure, a rack pressure controller 1820 and an exhaust fan 1812. As illustrated, plenum pressure controlled enclosure 1800 includes multiple equipment racks 1816. However, it should be understood that plenum pressure controlled enclosure 1800 may include any number of equipment racks 1816, such as 1 or 50, without departing from the scope of the present disclosure. Equipment racks 1816 intake cool air. Equipment racks 1816 may intake cool air through a floor 1818 or may intake air via a front, back, or side surface. Equipment racks 1816 expel heated air into ceiling plenum 1808. Equipment racks 1816 expel heated air into ceiling plenum 1808 through duct 1822. Alternatively, equipment racks 1816 may be directly coupled to ceiling plenum 1816 and may expel heated air directly into ceiling plenum 1808. Equipment racks 1816 may expel heated air utilizing exhaust fan 1812. Alternatively, equipment racks 1816 may include exhaust dampers rather than exhaust fan 1812. Rack pressure controller 1820 may detect a differential pressure utilizing a pressure sensor and control exhaust fan 1812 to maintain a specific differential pressure including, but not limited to, a neutral differential pressure such as zero. Alternatively, equipment racks 1816 may include input and/or exhaust dampers rather than exhaust fan 1812 and rack pressure controller 1820 may control one or more input and/or exhaust dampers to maintain a specific differential pressure. Ceiling plenum 1808 may include a ceiling plenum enclosure and one or more flow controllers 1814. Although ceiling plenum 1808 is illustrated with two flow controllers 1814, any number of flow controllers 1814 may be utilized, such as 1 or 15, without departing from the scope of the present disclosure. Ceiling plenum 1808 may intake warm air 1804 from equipment racks 1816 and expel warm air 1804. Ceiling plenum 1808 may expel warm air 1804 into cooling units 1802. Although plenum pressure controlled enclosure 1800 is illustrated with two cooling units 1802, any number of cooling units 1802 may be utilized without departing from the scope of the present disclosure. For example, plenum pressure controlled enclosure may comprise a single equipment rack 1816 coupled to ceiling plenum 1808 which is coupled to a single cooling unit 1802. Flow controllers 1814 may detect a differential pressure utilizing a pressure sensor and control cooling units 1802 to maintain a specific differential pressure including, but not limited to, a neutral pressure and a slightly negative differential pressure such as −1 ounce-force per square inch. Flow controllers 1814 may control cooling units 1802 to maintain a specific differential pressure by controlling one or more intake fans of cooling units 1802. By controlling differential pressures in equipment racks 1816 and ceiling plenum 1808, warm air 1804 may be efficiently drawn from equipment racks 1816 and cooled utilizing cooling units 1802.

Figure 19:
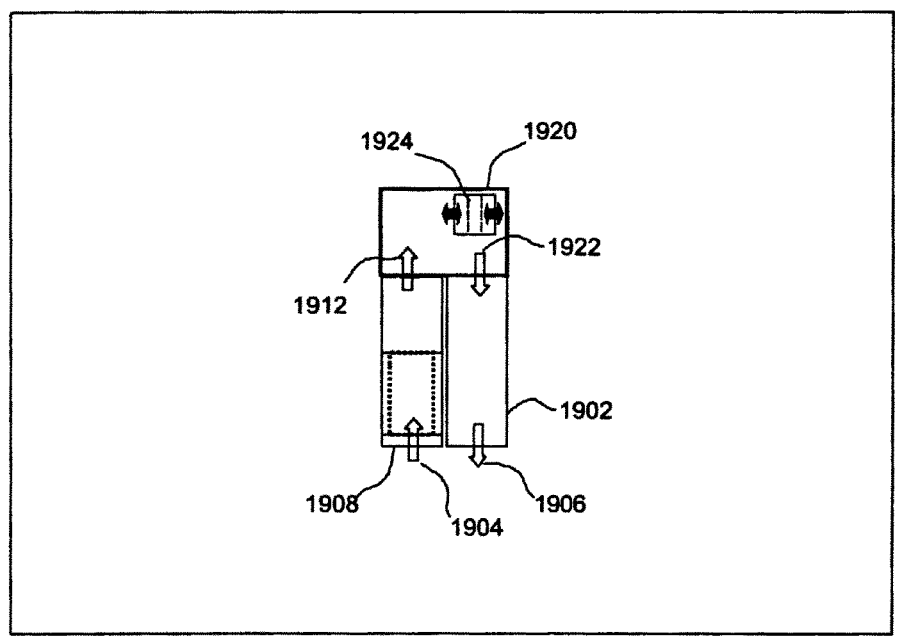
FIG. 19 illustrates a top view of a plenum pressure controller enclosure, in accordance with an alternative embodiment of the present invention.

Referring now to FIG. 19, a plenum pressure controlled enclosure 1900 in accordance with an alternative embodiment of the present invention is illustrated. Enclosure 1900 includes equipment rack 1908, plenum 1920, and cooling unit 1902. Equipment rack 1908 includes a rack enclosure. Equipment rack 1908 may intake cool air 1904 and expel warm air 1912 into plenum 1920. Equipment rack 1920 may include a pressure controller for sensing a differential pressure in equipment rack 1908 and maintain a specific differential pressure including, but not limited to, a neutral differential pressure such as zero. The pressure controller may maintain a specific differential pressure by controlling one or more intake and/or exhaust fans and/or by controlling one or more intake and/or exhaust dampers. Plenum 1920 may include a plenum enclosure and one or more flow controllers 1924. Plenum 1920 may intake warm air 1912 from equipment rack 1908 and expel warm air 1922 into cooling unit 1902. The one or more flow controllers 1924 may detect a differential pressure utilizing a pressure sensor and maintain a specific differential pressure including, but not limited to, a neutral pressure and a slightly negative differential pressure such as −1 ounce-force per square inch. The one or more flow controllers 1924 may detect a differential pressure utilizing a pressure sensor and maintain a specific differential pressure by controlling cooling unit 1902. The one or more flow controllers 1924 may detect a differential pressure utilizing a pressure sensor and maintain a specific differential pressure by controlling a cooling fan of cooling unit 1902. Cooling unit 1902 may intake warm air from plenum 1920, cool it, and expel the cooled air. By controlling differential pressures in equipment rack 1908 and plenum 1920, warm air 1912 may be efficiently drawn from equipment rack 1908 and cooled utilizing cooling unit 1902.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. A system for controlling plenum pressure for an equipment cabinet, comprising:
   a front surface, wherein the equipment cabinet intakes air through the front surface;
   a back surface, wherein the equipment cabinet expels air through the back surface;
   a first internal side, which is approximately perpendicular to the front surface and the back surface;
   a second internal side, which is approximately perpendicular to the front surface and the back surface;
   at least one enclosure fan;
   a pressure controller which includes a pressure sensor, wherein the pressure controller detects a differential pressure utilizing the pressure sensor and controls the at least one enclosure fan to in response to the differential pressure detected by the pressure sensor to maintain a negative pressure within the equipment cabinet; and
   at least one internal baffle mounted within the equipment cabinet;
   wherein the negative pressure maintained in the equipment cabinet causes makeup air to be drawn in the front surface of the equipment cabinet and the at least one internal baffle causes the makeup air drawn in the front surface of the equipment cabinet to be drawn through the equipment cabinet along the first internal side and prevents the makeup air drawn in the front surface of the equipment cabinet to be drawn through the equipment cabinet along the second internal side; wherein the at least one enclosure fan has a fan speed based on an amount of power received and the pressure controller controls the at least one enclosure fan by controlling the amount of power the at least one enclosure fan receives;
   further comprising at least one additional enclosure fan wherein the pressure controller controls the at least one additional enclosure fan in response to the differential pressure.

2. The system of claim 1, wherein the at least one enclosure fan comprises an exhaust fan.

3. The system of claim 1, wherein the at least one enclosure fan comprises an input fan.

4. The system of claim 1, wherein the pressure sensor comprises one selected from a pressure transducer and an air flow monitor.

5. The system of claim 4, wherein the at least one additional enclosure fan comprises an exhaust fan.

6. The system of claim 1, further comprising at least one additional pressure controller wherein the pressure controller and the at least one additional pressure controller communicate to control the at least one enclosure fan in response to the differential pressure.

7. The system of claim 1, wherein the equipment cabinet is configured to house a component, the component intaking air through an intake side and expelling air through an exhaust side, such that the intake side of the component faces the first internal side of the equipment cabinet.

* * * * *